Oct. 31, 1967   K. W. McLOAD   3,350,678
SEISMIC CABLE SYSTEM
Filed Oct. 24, 1965   2 Sheets-Sheet 1
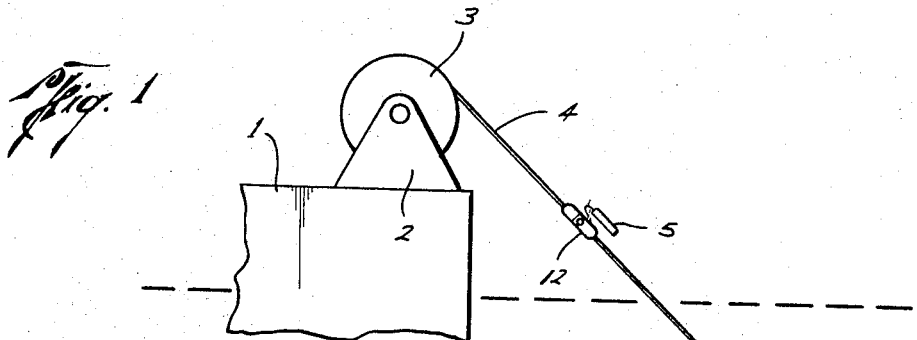
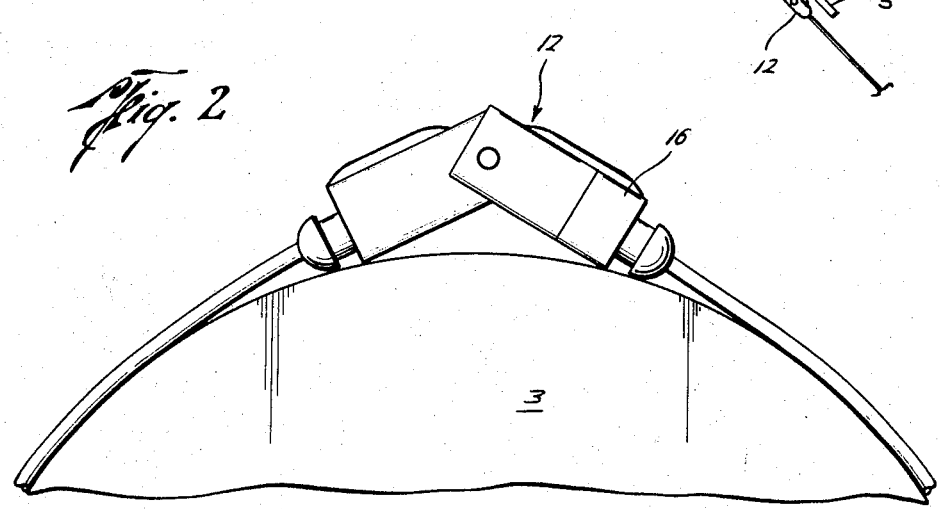
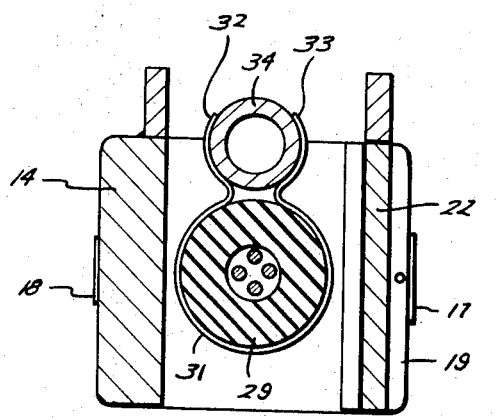
Kenneth W. McLoad
INVENTOR.
BY Harris, Sarkin
and Medlock
ATTORNEYS Oct. 31, 1967   K. W. McLOAD   3,350,678
SEISMIC CABLE SYSTEM
Filed Oct. 24, 1965   2 Sheets-Sheet 2
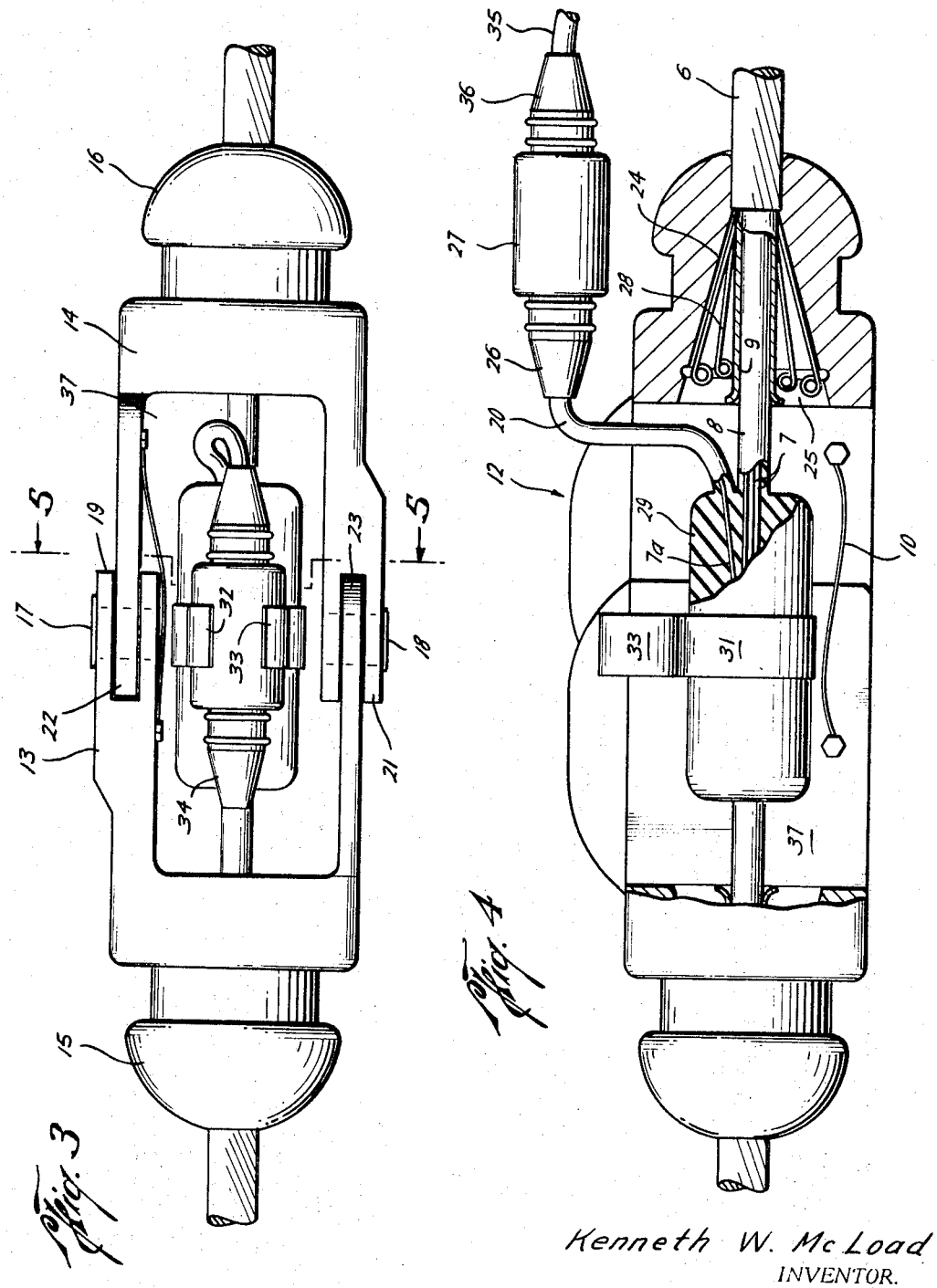
Kenneth W. McLoad
INVENTOR.
BY Harris, Larkin
and Medlock
ATTORNEYS United States Patent Office 3,350,678
Patented Oct. 31, 1967

3,350,678
SEISMIC CABLE SYSTEM
Kenneth W. McLoad, Houston, Tex., assignor to Vector Cable Company, Houston, Tex., a corporation of Texas
Filed Oct. 24, 1965, Ser. No. 504,715
4 Claims. (Cl. 339—151)

ABSTRACT OF THE DISCLOSURE

The particular embodiment described herein as illustrative of one form of the invention utilizes an article cable connector with provisions for housing a take-out device. The connector is comprised of two halves, each having one end connected to a cable. Parallel members on the opposite ends of the connector halves are pivotally connected and form a cavity between the members for housing a take-out device.

---

This invention relates to seismic cable systems and more particularly, but not by way of limitation, to cable systems employing a novel articulate connector.

Seismic cables used in oceanographic work are generally reeled to and from a drum which is mounted on a vessel from which the seismic operations are conducted. In at least one method of oceanographic exploration, for example, a seismic cable is reeled from a drum and towed behind the vessel from which the operations are controlled. A plurality of "take-out" devices such as seimic sensors are attached at intervals along the played-out portion of the cable to detect reflected waves forms which are generated in a conventional manner. At each point along the length of cable where a sensing device is interposed, it becomes necessary to provide some type of take-out cable from the main seismic cable to permit attachment of the sensing device. The seismic cables are usually armored by at least one helically wound layer of strong wire. This configuration has great resistance to crushing. However, when it is necessary, at intervals along the cable to bring connections from the interior of the cable for purposes of a take-out cable, the armor wires must be interrupted. At such an interruption previously employed devices usually utilize a rigid body into which all armor wires on both sides of the body are terminated. An electrical conductor is exposed within the body to form a take-out cable which is joined to a take-out device at some point near the rigid body. The rigid body is used to insure the strength of the cable system is unimpaired because of the interruption of the armor wires.

Whenever such an interruption in the cable is made and a body interposed, problems arise when the cable is spooled onto a drum. The rigid body upon being spooled over the drum will not conform to the surface of the drum causing the cable portions attached to the ends of the body to be placed under great stress. The bending of the cable portions attached to the body can destroy the armor wires resulting in yielding and subsquent failure. Further, if the take-out cable is not in some manner protected, it will be damaged by the reeling operation due to its being pressed beneath additional lengths of the main cable which may be wound over the take-out means. While one prior art device attempted to prevent the imposition of destructive stress by providing an articulate connector have sections mounted through a ball and socket arrangement, the connector would not in all instances permit the cable to conform to the surface of a drum. The contact area between the ball and socket is normally so great that the sections will not move one relative to the other when the cable is under tension, which it ordinarily is. Lubrication of the ball and socket will be of little avail since even limited exposure of the connector to water will remove the lubricant.

Accordingly, it is an object of this invention to provide a seismic cable system which may be reeled to and from a drum without destructive stresses being placed upon portions of the cable.

Another object of the invention is to provide a cable system provided with novel articulate connectors at intervals along the cable where take-out devices are to be attached.

Yet another object is to provide a connector for seismic cable systems which will permit protection of the take-out cable during reeling operations.

The invention may be generally described as a coupling for an armored electrical seismic cable which includes a core with conductors and outer armor wires comprising: housing means comprising first and second wall defining members arranged for relative pivotal movement about a point intermediate the ends of said housing means; means at the ends of said housing means for fixedly socketing the outer armor wires; enclosure means for said conductors disposed without said housing means, one of said conductors leading out of said enclosure means to form a take-out cable; take-out coupling means connected to said take-out cable and arranged to extend beyond said housing means for releasable connection with a take-out device; and means in said housing means for retaining the take-out coupling means within the wall defining members of said housing means.

To be more specific, reference is now made to the drawings in which:

FIG. 1 is an elevation view, partially cutaway, of a vessel upon which is mounted a drum from which extends a cable system employing one embodiment of the invention.

FIG. 2 is a partial elevation view of a drum used in seismic oceanographic work illustrating one embodiment of the invention.

FIG. 3 is a top plan view of the embodiment of the invention illustrated in FIG. 2.

FIG. 4 is a partially cutaway top plan view of the embodiment of the invention illustrated in FIGS. 2 and 3.

FIG. 5 is a section view along line 5—5 of FIG. 3.

Referring now to FIG. 1, oceanographic seismic exploration is generally conducted from a vessel 1 upon the stern of which is mounted by conventional means 2 a rotatable cable drum 3. Drum 3 is powered by conventional means (not shown) to permit the cable 4 disposed thereabout to be reeled to and from drum 3.

In at least one method of seismic exploration it becomes necessary to "play-out" cable 4 from drum 3, and as the cable 4 is played-out, to attach at intervals along its length take-out seismic devices such as sensors 5.

Cable 4 is ordinarily protected by a helically disposed wire armor 6, as particularly illustrated in FIG. 4. Referring to FIG. 4, a typical cable 4 carries a plurality of conductors 7 which are contained in a waterproof jacket such as rubber 8 which supports the armor 6 on its outer surface.

At intervals along cable 4 where sensors 5 are to be placed, it is necessary to interrupt the cable armor 6 in order to place sensor 5 in communication with one of the conductors 7. At such locations the strength of the cable would be weakened but for the provision of a stress bearing connector 12. Connector 12, as particularly illustrated by FIGS. 2–5, comprises opposed cavity forming bifurcated members 13 and 14 which are co-engaged for pivotal movement intermediate their butt ends 15 and 16, respectively, by hinge pins 17 and 18. A ground conductor 10 is preferably provided between members 13 and 14. As will be noted, members 13 and 14 are provided with bifurcated tips 19 and 21, respectively, which receive tips 22 and 23, respectively. Pin 17 is retainingly received through registering apertures in tips 19 and 22, and pin 18 in like manner is retainingly received through registering apertures in tips 21 and 23.

Members 13 and 14 may be interposed in cable 4 by threading cable 4 through butt ends 15 and 16. As both ends 15 and 16 are secured to cable 4 in the same manner only the connection of end 16 will be described. The armor 6 and sleeve 9 are severed and the strands of wire 28 are unraveled and curled, as illustrated in FIG. 4, to dispose them within conical recess 24 of end 16. After a short metal sleeve 9 has been placed around rubber 8, strands 28 are fixedly socketed within recess 24 by any conventional manner such as filling the recess with a molten metal 25 which solidifies upon cooling. The rubber 8 is removed from around a portion of the conductors 7 and one of the conductors 7a discontinued by severing.

Conductor 7a is "taken out" of cable 3 and covered to form part of a take-out cable 20 which is releasably connected by means of plug 26 to take-out coupling 27. While only one conductor 7a is shown removed from cable 3, it will be understood that conductor 7a may carry a plurality of conductors or in the alternative, more than one of the conductors 7 may be taken out for purposes of cable 20. Conductors 7 are protected by resilient material such as rubber body 29. Disposed about body 29 is a metal clip 31 provided with inturned bifurcated tips 32 and 33 which permit selective retaining of coupling 27 therebetween.

As cable 4 is reeled from drum 3 during use, protector cap 34, as illustrated in FIG. 3, is removed from coupling 27 and coupling 27 is removed from clip 31, as illustrated in FIG. 4. The sensor device 5 is then connected to take-out coupling 27 by means of a sensor cable 35 and plug 36 which are attached to sensor 5. An interval of the cable 4 is played out and another sensor 5 connected in the same manner.

When the cable 4 is reeled back onto drum 3, the sensors 5 are removed, the protector caps 34 replaced, and the couplings 27 clipped between tips 32 and 33 to retain them within cavities 37 formed by members 13 and 14. In this manner, take-out cable 20 and take-out coupling 27 are protected from damage when connector 12 is rolled onto drum 3, as illustrated in FIG. 2.

As will be obvious from FIG. 2, the articulate connector 12 generally conforms to the surface of the cable 4 reeled upon drum 3 and thus relieves destructive stress on portions of cable 4 adjacent to ends 15 and 16 of connectors 12.

Ths cable system employing connectors 12 permits rapid playing out and reeling in of cable 4 and rapid connection and disengagement of sensors 5. Through use of the selective retaining means the take-out cable 20 and coupling 27 can be safely stored within cavity 37 to prevent their damage during the reeling operations. It will be appreciated that the configuration of connector 12 may be streamlined to permit more compact winding of cable 3 on drum 4. Also, the hinge pins 17 and 18 may be modified to provide even less frictional engagement between members 13 and 14 as by providing a knife edge point of pivot.

Various embodiments will be obvious to those skilled in the art after a reading of the above description, and while rather specific terms have been used to describe one embodiment of the invention, they are not intended, nor should they be construed, as a limitation on the invention as defined in the claims.

What is claimed is:
1. A stress bearing connector for relatively flexible armored conductor core cable, comprising:
   a first member having a butt end and an opposite bifurcated end the bifurcations of which define a space therebetween;
   a second member having a butt end and an opposite end the bifurcations of which define a space therebetween, the bifurcations of the first and second members being co-engaged in an opposed relationship and arranged to permit pivotal movement of one member relative to the other;
   means proximate the butt end of each member for securing cable armor thereto so that the conductors carried by the cable pass through the butt ends and are exposed to the space defined by the bifurcations, at least one of the conductors being discontinued for a take-out cable;
   and take-out means positioned in the space defined by said co-engaged bifurcations and connected to said take-out cable, and said take-out means including a take-out coupling arranged to extend beyond said housing means for releasable connection with a take-out device.
2. The connector of claim 1 including:
   means carried within the housing means for selectively retaining the take-out coupling within the space defined by the bifurcations.
3. The connector of claim 2 wherein the means for securing the connector comprise:
   a spring like bifurcated clip carried about the conductors and provided with inturned tips which are adapted to retainingly hold the take-out coupling when inserted therebetween.
4. For a seismic cable system in which a seismic cable is reeled to and from a drum and take-out means are provided on the main cable at selected points along its length, the improvement comprising:
   housing means in the length of main cable at said selected points protecting said take-out means, each of said housing means being connected to the main cable to form a part thereof;
   said housing means each being comprised of a pair of oppositely disposed members, each of said members having a pair of spaced parallel arms defining a cavity therebetween;
   and pin means pivotally connecting the arms of said oppositely disposed members for providing an articulate connection therebetween to relieve stresses on said cable as said cable is reeled on a drum;
   said take out means being positioned in said housing cavity between said parallel arms.

References Cited
UNITED STATES PATENTS

| 464,548 | 12/1891 | Arnold | 339—150 X |
| 2,654,077 | 9/1953 | McLoad. | |
| 2,667,531 | 1/1954 | McLoad | 174—70.1 |
| 2,753,535 | 7/1956 | Miller et al. | 339—151 X |
| 2,971,178 | 2/1961 | Reesby | 174—86 X |

MARVIN A. CHAMPION, *Primary Examiner.*

J. R. MOSES, *Assistant Examiner.*

UNITED STATES PATENT OFFICE
CERTIFICATE OF CORRECTION

Patent No. 3,350,678                                                  October 31, 1967

Kenneth W. McLoad

It is hereby certified that error appears in the above numbered patent requiring correction and that the said Letters Patent should read as corrected below.

In the heading to the printed specification, lines 3 and 4, for "assignor to Vector Cable Company, Houston, Tex., a corporation of Texas" read -- assignor, by mesne assignments, to Schlumberger Technology Corporation, Houston, Tex., a corporation of Texas --; column 1, line 12, for "article" read -- articulate --; line 15, for "and" read -- end --; line 49, after "insure" insert -- that --; column 2, line 22, for "without" read -- within --; column 3, line 50, for "Ths" read -- The --.

Signed and sealed this 19th day of November 1968.

(SEAL)

Attest:

Edward M. Fletcher, Jr.

Attesting Officer

EDWARD J. BRENNER

Commissioner of Patents